United States Patent
Man

(10) Patent No.: US 10,320,081 B2
(45) Date of Patent: Jun. 11, 2019

(54) CONTAINER HAVING A SLOT ANTENNA

(71) Applicant: BLACKBERRY LIMITED, Waterloo (CA)

(72) Inventor: Ying Tong Man, Waterloo (CA)

(73) Assignee: BLACKBERRY LIMITED, Waterloo, Ontario ( * ) Notice: Subject to any disclaimer, the term of this patent is extended or adjusted under 35 U.S.C. 154(b) by 109 days.

(21) Appl. No.: 15/264,942

(22) Filed: Sep. 14, 2016

(65) Prior Publication Data

US 2018/0019518 A1 Jan. 18, 2018

Related U.S. Application Data

(60) Provisional application No. 62/361,552, filed on Jul. 13, 2016.

(51) Int. Cl.
| | |
|---|---|
| *H01Q 13/10* | (2006.01) |
| *G08B 1/08* | (2006.01) |
| *G08B 13/06* | (2006.01) |
| *H04W 4/02* | (2018.01) |
| *H01Q 1/22* | (2006.01) |
| *H01Q 1/48* | (2006.01) |

(52) U.S. Cl.
CPC ............ *H01Q 13/10* (2013.01); *G08B 1/08* (2013.01); *G08B 13/06* (2013.01); *H01Q 1/22* (2013.01); *H01Q 1/48* (2013.01); *H04W 4/02* (2013.01)

(58) Field of Classification Search
CPC ............ H01Q 13/10; H01Q 1/48; H01Q 1/22; H04W 4/02; G08B 13/06; G08B 1/08
USPC .................................. 343/893, 771
See application file for complete search history.

(56) References Cited

U.S. PATENT DOCUMENTS

| | | |
|---|---|---|
| 2,821,708 A | 1/1958 | Blancher |
| 3,757,344 A | 9/1973 | Pereda |
| 4,369,447 A | 1/1983 | Edney |
| 5,565,858 A | 10/1996 | Guthrie |
| 6,664,931 B1 | 12/2003 | Nguyen et al. |
| 7,202,831 B2 | 4/2007 | Chen et al. |
| 7,394,361 B1 | 7/2008 | Twitchell, Jr. |
| 7,825,803 B2 | 11/2010 | Neff et al. |
| 7,936,271 B2 | 5/2011 | Karr et al. |

(Continued)

FOREIGN PATENT DOCUMENTS

| | | |
|---|---|---|
| WO | 2012040817 A1 | 4/2012 |
| WO | 2015056048 A1 | 4/2015 |

OTHER PUBLICATIONS

International Search Report and Written Opinion dated Aug. 3, 2017, by ISA, re PCT Patent Application No. PCT/IB2017/052642. 8 pages.

(Continued)

*Primary Examiner* — Hai V Tran
(74) *Attorney, Agent, or Firm* — Perry + Currier Inc.

(57) ABSTRACT

A container having a slot antenna is provided. In particular, a shipping container is provided, the shipping container comprising: a chassis; a door moveably mounted to the chassis, the door having an external surface and an internal surface; at least one slot antenna located at the external surface of the door; a tracking device having a radio transceiver, the tracking device located on the internal surface of the door; and, an antenna feed coupling the radio transceiver to the slot antenna through the internal surface of the door.

20 Claims, 13 Drawing Sheets

(56) References Cited

U.S. PATENT DOCUMENTS

| | | | |
|---|---|---|---|
| 9,130,328 B1* | 9/2015 | Huang | H01R 13/2421 |
| 2004/0041705 A1 | 3/2004 | Auerbach et al. | |
| 2004/0196152 A1 | 10/2004 | Tice | |
| 2006/0255949 A1* | 11/2006 | Roeder | B62B 3/06 |
| | | | 340/572.7 |
| 2008/0136624 A1 | 6/2008 | Twitchell | |
| 2008/0191961 A1* | 8/2008 | Tuttle | H01Q 21/00 |
| | | | 343/893 |
| 2009/0153407 A1* | 6/2009 | Zhang | H01Q 1/243 |
| | | | 343/702 |
| 2009/0201152 A1 | 8/2009 | Karr et al. | |
| 2011/0260869 A1 | 10/2011 | Gagnon et al. | |
| 2014/0030922 A1* | 1/2014 | Schmitt | H01R 13/6587 |
| | | | 439/607.2 |
| 2015/0095255 A1* | 4/2015 | Hall | G01S 19/16 |
| | | | 705/333 |
| 2015/0148855 A1* | 5/2015 | Szakelyhidi | A61N 1/3904 |
| | | | 607/5 |
| 2015/0356393 A1* | 12/2015 | Daoura | G06Q 10/00 |
| | | | 340/8.1 |
| 2015/0373487 A1* | 12/2015 | Miller | H04W 4/02 |
| | | | 455/456.1 |

OTHER PUBLICATIONS

Extended European Search Report issued by the European Patent Office dated Mar. 29, 2019, corresponding European Patent Appl No. 17827066.6.

\* cited by examiner

CONTAINER HAVING A SLOT ANTENNA

FIELD

The specification relates generally to antennas, and specifically to a container having a slot antenna.

BACKGROUND

Radio-based tracking devices can be mounted on containers, and in particular shipping containers, to remotely track position, and the like, of the containers. Such containers are shipped and/or handled under harsh conditions and/or physically demanding conditions, as they can be stacked, lifted by cranes, stowed on cargo ships, placed on trucks, and the like. Hence, mounting tracking devices on an external surface of such containers can easily lead to the tracking devices being physically damaged. While tracking devices can be mounted internal to the containers, the containers are often made of metal and hence the containers also act as Faraday cages.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
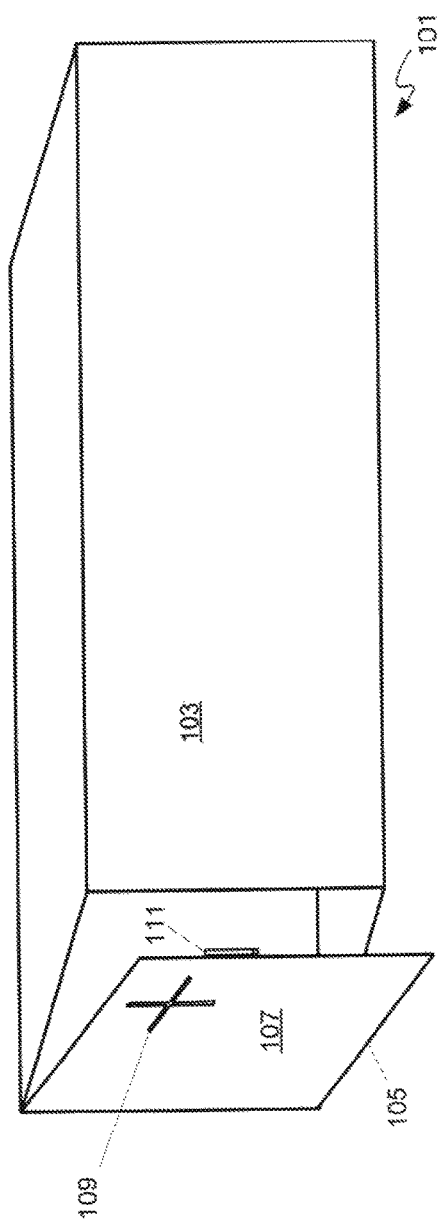
FIG. 1 depicts a container having a slot antenna, according to non-limiting implementations.

The present disclosure describes containers, and in particular shipping containers, that include a door moveably attached to a chassis, a tracking device mounted on an internal surface of the door and/or inside the chassis, a slot antenna located at the external surface of the container (and in particular the door), and an antenna feed that couples a radio transceiver of the tracking device to the slot antenna through the internal surface of the container and/or the door. The coupling can comprise capacitively coupling an electrical feed and a ground of the antenna feed to the slot antenna by coupling the electrical feed and the ground to the internal surface of the container and/or the door; and/or the coupling can comprise providing apertures in the container and/or the door and coupling the electrical feed and the ground through the apertures. Furthermore, while the external surface of the door can be a convenient place to locate the slot antenna, the slot antenna can be alternatively located anywhere at and/or in and/or on the chassis, including locations that do not include the door. Similarly, while the internal surface of the door can be a convenient place to locate the tracking device, the tracking device can be located anywhere inside the chassis. Furthermore, while implementations are described that include shipping containers, devices described herein can be used with other types of containers.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electrically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

Furthermore, as will become apparent in this specification, certain antenna components may be described as being configured for generating a resonance at a given frequency and/or resonating at a given frequency and/or having a resonance at a given frequency. In general, an antenna component that is configured to resonate at a given frequency, and the like, can also be described as having a resonant length, a radiation length, a radiating length, an electrical length, and the like, corresponding to the given frequency. The electrical length can be similar to, or different from, a physical length of the antenna component. The electrical length of the antenna component can be different from the physical length, for example by using electronic components to effectively lengthen the electrical length as compared to the physical length. The term electrical length is most often used with respect to simple monopole and/or dipole antennas. The resonant length can be similar to, or different from, the electrical length and the physical length of the antenna component. In general, the resonant length corresponds to an effective length of an antenna component used to generate a resonance at the given frequency; for example, for irregularly shaped and/or complex antenna components that resonate at a given frequency, the resonant length can be described as a length of a simple antenna component, including but not limited to a monopole antenna and a dipole antenna, that resonates at the same given frequency.

An aspect of the specification provides a shipping container comprising: a chassis; a door moveably mounted to the chassis, the door having an external surface and an internal surface; at least one slot antenna located at the external surface of the door; a tracking device having a radio transceiver, the tracking device located on the internal surface of the door; and, an antenna feed coupling the radio transceiver to the slot antenna through the internal surface of the door.

The antenna feed can comprise a feed point and a ground each located at the internal surface of the door opposite the slot antenna on the external surface.

The antenna feed can capacitively couple the radio transceiver to the slot antenna through the internal surface of the door.

The antenna feed can electrically connect the radio transceiver to the slot antenna through the internal surface of the door.

The shipping container can further comprise at least one bracket attaching a feed point and a ground of the antenna feed to the internal surface of the door.

The shipping container can further comprise one or more apertures through the door, the antenna feed comprising a feed point and a ground that couples the antenna feed to the slot antenna through the one or more apertures.

A feed point and a ground of the antenna feed can comprise a pair of spring-loaded electrical connectors extending from a surface of the tracking device, and the coupling of the radio transceiver to the slot antenna through the internal surface of the door can occur using the spring-loaded electrical connectors.

A feed point and a ground of the antenna feed can comprise a pair of electrical connectors extending from a surface of the tracking device, and the internal surface of the door can comprise a pair of receptacles configured to mate with the electrical connectors.

The door can be located at an end of the chassis, the chassis being elongated.

The tracking device can be attached to the internal surface of the door using one or more of a bracket and a protective cage.

The slot antenna can comprise one or more of a cellular antenna, a GPS (Global Positioning System) antenna, and a GLONASS (Navigazionnaya Sputnikovaya Sistema) antenna.

The slot antenna can comprise one or more slots in the external surface of the door.

The slot antenna can comprise a plurality of slots, each configured to transmit and receive a respective set of frequencies.

The antenna feed can comprise one or more antenna feeds each configured to convey a respective set of frequencies between the radio transceiver and the slot antenna.

The antenna feed can be configured to convey a plurality of sets of frequencies between the radio transceiver and the slot antenna.

Another aspect of the specification provides a container comprising: a chassis; at least one slot antenna located at an external surface of the chassis; a tracking device having a radio transceiver, the tracking device located inside the chassis; and, an antenna feed coupling the radio transceiver to the slot antenna through an internal surface of the chassis.

Figure 2:
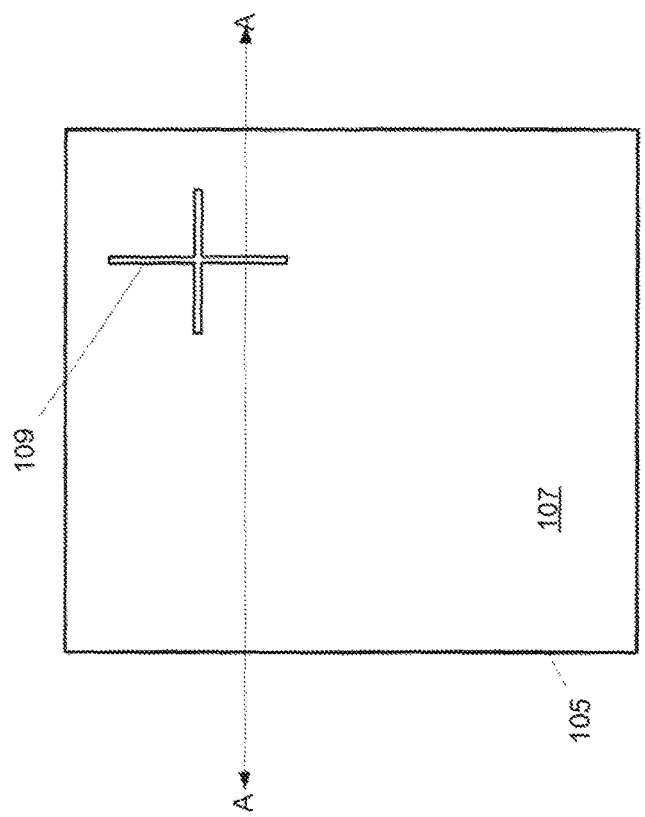
FIG. 2 depicts an end view of the container of FIG. 1, and in particular an external surface of a door of the container that includes the slot antenna, according to non-limiting implementations.
Figure 3:
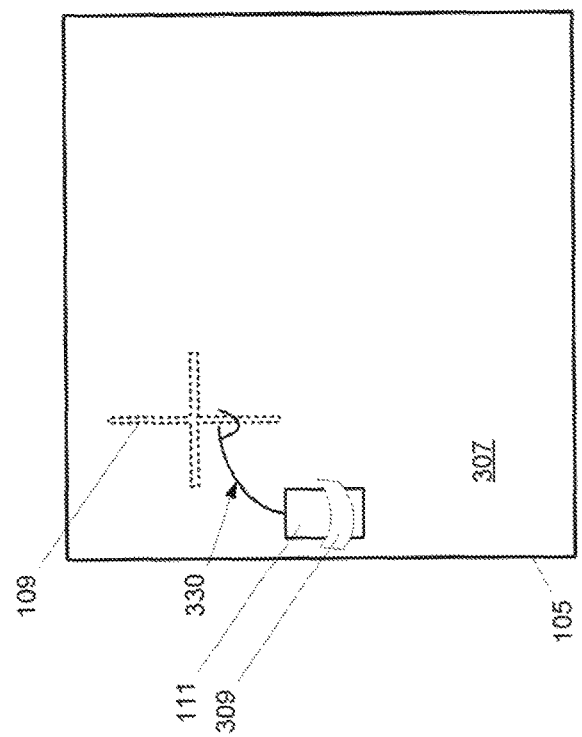
FIG. 3 depicts an internal surface of the door of FIG. 2, according to non-limiting implementations.

FIG. 1, FIG. 2, and FIG. 3 respectively depict a perspective view of a container 101, an external surface of a door of container 101, and an internal surface of the door of container 101. In particular, container 101 comprises: a chassis 103; a door 105 moveably mounted to chassis 103, door 105 having an external surface 107 and an internal surface (as best seen in FIG. 3). Container 101 further comprises at least one slot antenna 109 located at external surface 107 of door 105 and a tracking device 111 located inside chassis 103 and, in particular, on the internal surface of door 105. As depicted, and as best seen in FIG. 3, tracking device 111 is mounted and/or attached to internal surface of door 105 using any combination of brackets, mechanical devices straps, adhesives, fasteners and the like. However, in other implementations, tracking device 111 can be mounted anywhere inside chassis 103. Details of tracking device 111 and a relationship between tracking device 111 and slot antenna 109 will be described below with respect to FIG. 3 to FIG. 9.

With further reference to FIG. 1, as depicted container 101 comprises a shipping container, and hence container 101 and/or chassis 103 is generally elongated. For example, container 101 and/or chassis 103 can comprise an elongated box having a longitudinal axis with four long sides forming a top, a bottom and two sides joining the top and the bottom, and two shorter and/or smaller sides and/or faces at respective opposite ends of the four long sides. However, container 101 and/or chassis 103 can be any shape compatible with containing and/or shipping goods therein.

Furthermore, while container 101 and/or chassis 103 is depicted as having generally flat sides, at least a portion of container 101 and/or chassis 103 can be at least partially corrugated and/or include ribs to ruggedize and/or provide structural integrity to container 101 and/or chassis 103.

To ruggedize container 101 and/or chassis 103, at least chassis 103 comprises (and/or is made of) metal including, but not limited to steel, and the like, and further the metal can be of a thickness and dimensions compatible with containing and/or shipping goods therein. Hence, container 101 and/or chassis 103 generally acts like a Faraday cage to electronic devices located therein, including, but not limited to, tracking device 111.

As depicted door 105 is located at an end of container 101 and/or chassis 103 and in particular, a shorter and/or smaller side and/or face of container 101 and/or chassis 103. However, door 105 can be located anywhere on and/or in container 101 and/or chassis 103, including either end along the longitudinal axis, a front, a back, a top, a bottom and indeed any side of container 101 and/or chassis 103. Door 105 can be made of a material similar to chassis 103 including, but not limited to metal and/or steel; hence door 105 contributes to the Faraday cage effect caused by chassis 103.

Door 105 is generally moveably mounted to chassis 103 and can move between a closed and/or locked position, in which chassis 103 is at least partially sealed to contain goods therein, and an open and/or unlocked position, such that goods can be loaded into and/or unloaded from inside chassis 103. As depicted, door 105 opens outwards and is in at least a partially open position. Hence, while not depicted, door 105 generally comprises at least one mechanism, which can include, but is not limited to hinges, moveably mounting door 105 to chassis 103, as well as to enable door 105 to move between the open and closed positions. Furthermore, door 105 can alternatively open inward.

While not depicted, door 105 and/or chassis 103 can include locking devices and/or latching devices, and the like (including, but not limited to, latches, locks, and the like) for locking and/or latching door 105 into the closed position.

Furthermore, container 101 can comprise more than one door; for example, door 105 can be one of a pair of double doors that open outward (and/or inward) at an end of container 101 to provide access to the interior of container 101 to load and/or unload goods. Furthermore, door 105 can comprise a roll-up door, an overhead door, and the like.

In yet further implementations, container 101 can comprise a refrigerated container (and hence can include one or more air conditioning units and the like) and/or an insulated container. In these implementations, one or more of door 105 and chassis 103 can be insulated.

As depicted, slot antenna 109 is located at external surface 107 of door 105; however, slot antenna 109 can be located at any surface of chassis 103, and in particular at any external surface of chassis 103. A location of slot antenna 109 can alternatively be referred to as slot antenna 109 being located in external surface 107 of door 105 and/or in any external surface of chassis 103. However, it can be particularly convenient to locate slot antenna 109 in external surface 107 of door 105 as, when container 101 is stacked and/or stored with other (e.g. metal) containers (which can be similar to, or different from container 101), shipping practises are such that the containers are stacked and/or stored with respective doors being accessible. Hence, when slot antenna 109 is located at external surface 107 of door 105, the possibility of slot antenna 109 being located next to metal surfaces of other containers can be reduced.

Slot antennas are known to persons of skill in the art and generally comprise slots in a metal surface which act as a ground plane for the slot antenna. Slot antennas can include troughs, and the like, milled into a metal surface, and/or apertures in the metal surface. Either way, a slot antenna comprises an absence of material in a ground plane that functions similar to a radial antenna, and the like. Hence, for example, door 105 and/or chassis 103 comprises a ground plane for slot antenna 109, as described hereafter.

Slot antenna 109 comprises one or more slots in external surface 107 of door 105; as depicted, slot antenna 109 comprises a cross shape, having two slots of unequal length, however slot antenna 109 can comprise a single slot, slots of equal length which are crossed and/or connected, or not crossed and/or not connected. Furthermore, as depicted in FIGS. 1 to 3, slot antenna 109 comprises troughs in external surface 107 that do not extend through door 105 to prevent moisture, water, air, and the like, from entering chassis 103 through slot antenna 109. However, slot antenna 109 can alternatively comprise apertures through door 105, for example for ease of manufacturing; in some of these implementations, the apertures can be filled with non-conducting material to seal the apertures against moisture, water, air, and the like.

Furthermore, the respective lengths of the slots of slot antenna 109 define respective radiating lengths, and the like, of slot antenna 109 that correspond to one or more respective sets of frequencies and/or wavelengths at which slot antenna 109 can radiate, and/or send and receive signals. For example, slot antenna 109 can comprise one or more of a cellular antenna, a WiFi antenna, a GPS (Global Positioning System) antenna, and a GLONASS (Navigazionnaya Sputnikovaya Sistema) antenna. In particular, slot antenna 109 can comprise: a first antenna configured to communicate with one or more location determining networks, including, but not limited to, a GPS network and/or a GLONASS network; and a second antenna configured to communicate with one or more communication networks, including, but not limited to, a cellular network and/or a WiFi network. Indeed, tracking device 111, when coupled to slot antenna 109, can be configured to determine a location of container 101 using the first antenna configured to communicate with a location determining network, and transmit the location of container 101 to a remote device.

Hence, slot antenna 109 can comprise a plurality of slot antennas, and in particular one or more slot antennas in external surface 107 of door 105. Furthermore, in these implementations, each slot antenna, of the plurality of slot antennas, can be configured to transmit and receive a respective set of frequencies.

Attention is next directed to FIG. 2, which depicts an end view of container 101 and in particular an end that includes external surface 107 of door 105. In particular, FIG. 2 shows a location of slot antenna 109 at an "upper right" corner of door 105, though the terms "upper" and "right" are used with respect to FIG. 2 only and the corner of door 105 where slot antenna 109 is located could be in any corner of door 105. Nonetheless, in some implementations, container 101 can comprise a top surface, and slot antenna 109 can be located at external surface 107 of door 105 towards the top surface of container 101 to increase the likelihood of slot antenna 109 being better located to transmit and receive signals. Such a likelihood assumes that a higher position of slot antenna 109 on container 101 is generally desirable.

FIG. 2 also depicts a line A-A, examples cross-sections of door 105 through line A-A depicted in FIGS. 6 to 9, described below.

Attention is next directed to FIG. 3 which depicts tracking device 111 attached to an internal surface 307 of door 105 using, for example, a bracket 309. However, any device and/or mechanism for attaching tracking device 111 to internal surface 307 of door 105 (and/or chassis 103) is within the scope of present implementations, including, but not limited to, any suitable combination of brackets, mechanical devices straps, adhesives, fasteners and the like. Indeed, in some implementations a physical housing of tracking device 111 can be adapted for attachment to internal surface 307 of door 105 (and/or chassis 103) and include holes and/or apertures, and the like, through which fasteners can be received to attach tracking device 111 to internal surface 307 of door 105 (and/or chassis 103).

While not depicted, tracking device 111 can further be mounted inside a protective device which can include, but is not limited to, a protective cage and the like. Such a protective device can be integrated with bracket 309. Furthermore, a housing of tracking device 111 can comprise a ruggedized material that is non-conducting which can include, but is not limited to, hard plastics, resins, and the like.

FIG. 3 also depicts slot antenna 109 in broken lines to indicate a position of slot antenna on external surface 107 of door 105 relative to tracking device 111; however; it is appreciated that in depicted implementations, slot antenna 109 does not extend through door 105. FIG. 3 also depicts connections 330 between tracking device 111 and slot antenna 109 described below. However, as depicted, connections 330 can include cables, wires and the like that connect and/or couple tracking device 111 to slot antenna 109 through internal surface 307. In particular, connections 330 can comprise one or more elements of an antenna feed of tracking device 111 that connect the antenna feed of tracking device 111 to slot antenna 109. Furthermore, while tracking device 111 is depicted as being attached to internal surface 307 of door 105 adjacent a position of slot antenna 109 on the opposite external surface 107, tracking device 111 can be located anywhere in container 101, with a length of connections 330 adapted accordingly.

Figure 4:
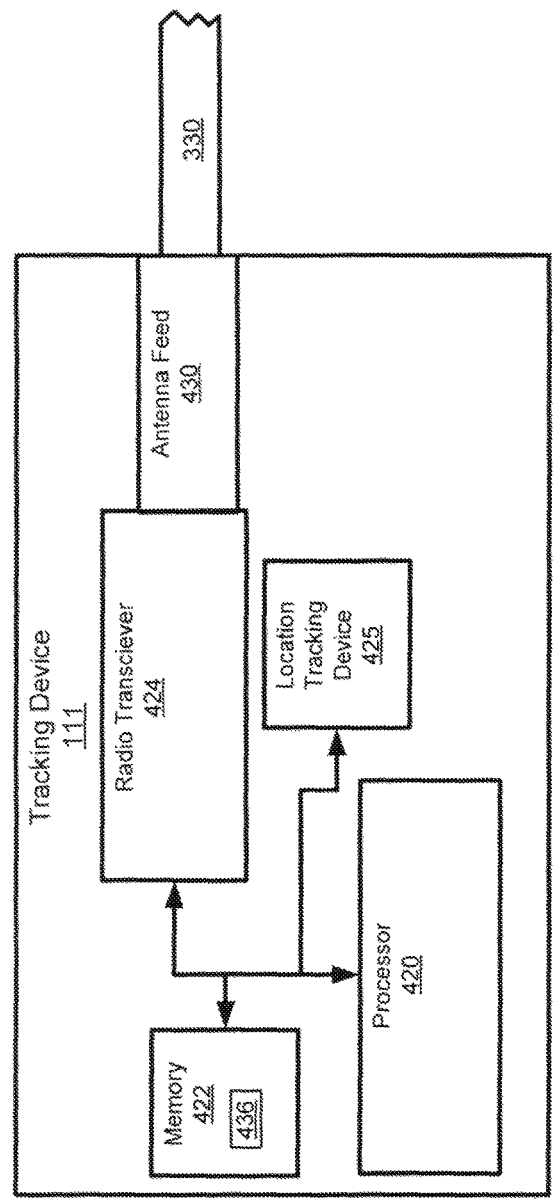
FIG. 4 depicts a block diagram of a schematic of a tracking device of the container of FIG. 1, according to non-limiting implementations.

Attention is next directed to FIG. 4 which depicts a schematic diagram of tracking device 111. In particular, tracking device 111 comprises a device adapted to track a position of container 101, and includes a processor 420, a memory, a radio transceiver 424, a location tracking device 425, and an antenna feed 430 coupling radio transceiver 424 to slot antenna 109 through internal surface 307 of door 105; for example, as depicted (and with further reference to FIG. 3), antenna feed 430 can include and/or is connected to, connections 330 coupling antenna feed 430 to internal surface 307 of door 105.

Tracking device 111 will be described hereafter. In particular, tracking device 111 can be any type of electronic device that can be used in a self-contained manner to communicate with one or more networks and/or communication networks using slot antenna 109 to track a position of container 101. Tracking device 111 includes, but is not limited to, any suitable combination of electronic devices, communications devices, computing devices, portable electronic devices, mobile computing devices, portable computing devices, and the like. Other suitable devices are within the scope of present implementations.

It should be emphasized that the structure of tracking device 111 in FIG. 4 is purely an example, and contemplates a device that can be used for communicating with both a location tracking network and a communication network.

While not depicted, tracking device 111 can further include one or more input devices, a display device, a microphone and/or a speaker.

Tracking device 111 comprises at least one input device 428 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Tracking device 111 comprises processor 420 which can include any suitable combination of processors and/or a plurality of processors, including but not limited to one or more central processors (CPUs) and/or one or more processing units; either way, tracking device 111 comprises a hardware element and/or a hardware processor. Indeed, in some implementations, tracking device 111 can comprise an ASIC (application-specific integrated circuit) and/or an FPGA (field-programmable gate array) specifically configured to implement the functionality of tracking device 111. Hence, tracking device 111 and/or processor 420, is not necessarily a generic computing device and/or a generic processor and/or a generic component, but a device specifically configured to implement specific functionality and in particular determining a location of container 101 and wirelessly providing the location to a remote device. For example, tracking device 111, together, can specifically comprise an engine configured to determine a location of container 101 and wirelessly providing the location to a remote device.

Memory 422 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of tracking device 111 as described herein are typically maintained, persistently, in memory 422 and used by tracking device 111 which makes appropriate utilization of volatile storage during the execution of such programming instructions. Those skilled in the art recognize that memory 422 is an example of computer readable media that can store programming instructions executable on tracking device 111. Furthermore, memory 422 is also an example of a memory unit and/or memory module and/or a non-volatile memory.

In particular, memory 422 stores a respective application 436, which, when processed by processor 420, enables tracking device 111 to: determine a location of container 101 (e.g. using slot antenna 109, radio transceiver 424, antenna feed 430 and location determining device 425) and wirelessly transmit the location, for example to a remote device. The transmission of the location can be broadcast periodically, pushed to the remote device and/or transmitted to the remote device when a request for the location is received from the remote device. The remote device can be a component of a system which tracks locations of containers, including, but not limited to container 101. Furthermore, memory 422 can further store one or more identifiers of tracking device 111 and/or container 101, and tracking device 111 can transmit the one or more identifiers with the location.

Radio transceiver 424 and antenna feed 430 together form a communication interface implemented as one or more radios and/or connectors and/or network adaptors, configured to communicate wirelessly one or more communication networks and/or location determining networks using slot antenna 109, including but not limited to any suitable combination of cell-phone networks, cellular network networks (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution). TDD (time division duplexing), TDD-LTE (TDD-Long Term Evolution), TD-SCDMA (Time Division Synchronous Code Division Multiple Access) and the like, wireless data, WLAN (wireless local area network) networks, WiFi networks, WiMax networks, packet based networks, the Internet, analog networks, the PSTN (public switched telephone network), access points, GPS networks, GLONASS networks, and the like, and/or a combination. In particular, the communication interface can communicate with a location determining network (e.g. a GPS and/or a GLONASS network, and the like) and a communication network (e.g. a cellular network, a WiFi network, a WLAN, and the like).

However, while a location of container 101 can be determined using a GPS and/or a GLONASS network, in other implementations a location of container 101 can be determined using triangulation techniques (e.g. using one or more of a cellular network, a WiFi network, a WLAN, and the like); in these implementations, slot antenna 109 and/or tracking device 111 can be configured to communicate with only one or more communication networks and not a location determining network.

Hence, the location of container 101 as determined by tracking device 111 can include, but is not limited to, GPS coordinates, GLONASS coordinates, longitude/latitude, triangulations coordinates, and/or relative coordinates (e.g. relative to a local environment in which container 101 is placed, such as a ship, a warehouse, a shipping yard, and the like).

Hence, it should now be apparent that location tracking device 425 can be optional and/or can be integrated with one or more of processor 420 and/or radio transceiver 424. When present, location tracking device 425 can comprise a GPS device and/or a GLONASS device which enables tracking device 111 to communicate with a GPS network and/or a GLONASS network, and/or other location tracking networks, for example via radio transceiver 424, antenna feed 430 and slot antenna 109.

While not depicted, tracking device 111 can further comprise a power source, including but not limited to a battery and/or a power pack, and/or a connection to an external power supply, or any other suitable power source, as well as a housing and the like. For example, container 101 can include one or more batteries and/or power packs mounted within chassis 103 separate from tracking device 111, and tracking device 111 can be coupled to the one or more batteries and/or power packs, using any suitable combination of connectors and/or cables, to power components thereof.

Furthermore, a housing of tracking device 111 is appreciated to be non-conducting such that electrical coupling to internal surface 307 occurs using components of antenna feed 430 and not via the housing.

In any event, it should be understood that a wide variety of configurations for tracking device 111 are contemplated.

Figure 5:
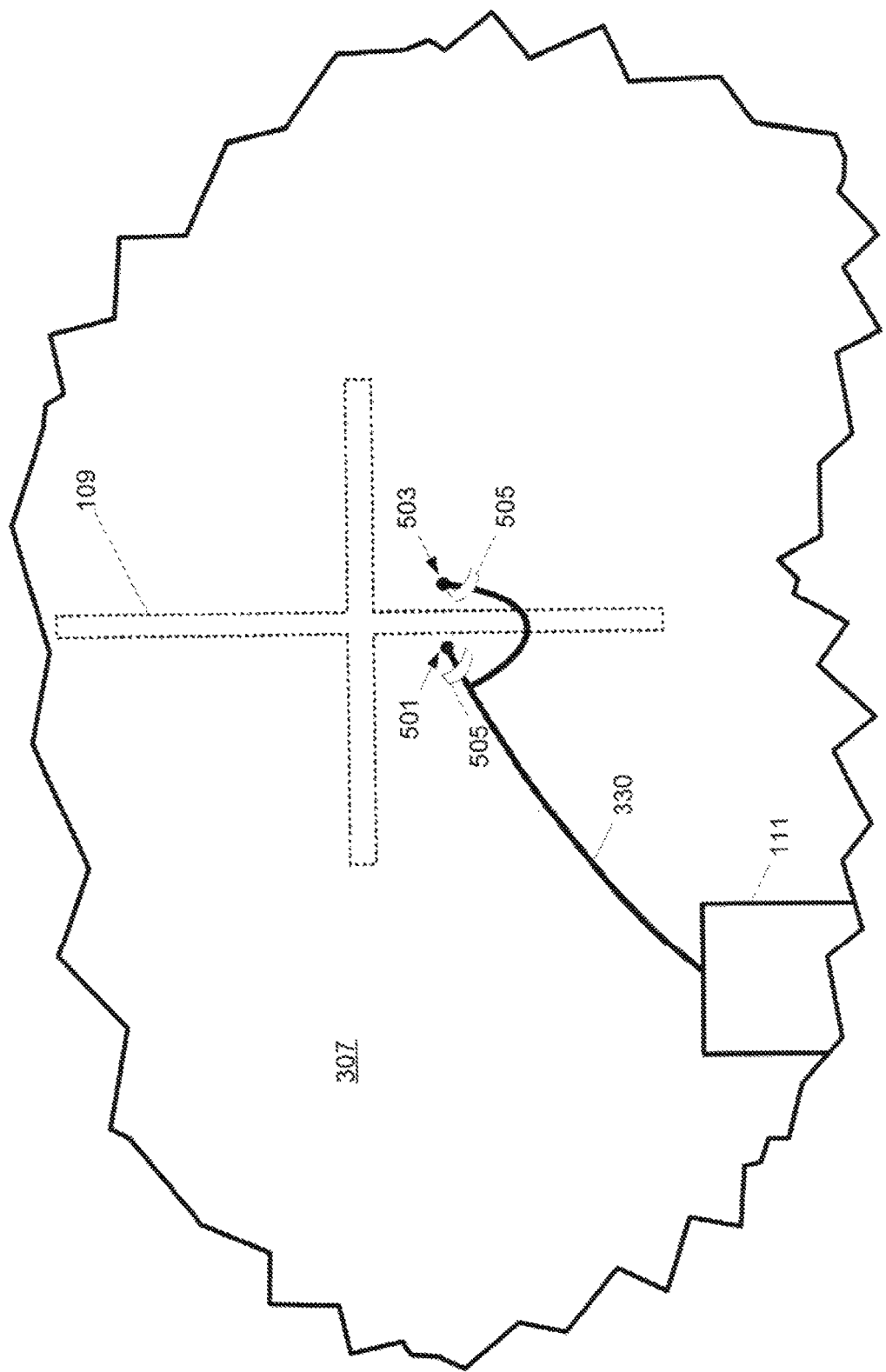
FIG. 5 depicts detail of connections between the tracking device and the slot antenna, according to non-limiting implementations.

Attention is next directed to FIG. 5 which depicts details of locations of connections 330 between tracking device 111, internal surface 307 of door 105 and slot antenna 109. While only a portion of internal surface 307 and tracking device 111 are depicted, it is appreciated that they are nonetheless present, as well as components of tracking device 111 and antenna feed 430. Similar to FIG. 3, slot antenna 109 is depicted in broken lines to indicate a location of slot antenna 109 at external surface 107 relative to tracking device 111.

As depicted, connections 330 (which can comprise a component of antenna feed 430) comprises a feed point 501 and a ground 503 of antenna feed 430, each located at internal surface 307 of door 105 opposite slot antenna 109 on external surface 107. For example, feed point 501 and ground 503 are each located on opposite sides of a slot of slot antenna 109. Furthermore, while each of feed point 501 and a ground 503 are depicted as being at a particular respective location relative to slot antenna 109, each of feed point 501 and ground 503 can be at other locations, as long as feed point 501 and ground 503 are each located on opposite sides of a slot of slot antenna 109. In particular, locations of each of feed point 501 and ground 503 can be switched and the functionality of tracking device 111 and slot antenna 109 will not be affected, as long as they are located on opposite sides of a slot of slot antenna 109.

In particular, feed point 501 comprises a connection which conveys signals between antenna feed 430 and slot antenna 109, while ground 503 comprises a connection between antenna feed 430 and a ground plane of container 101 and/or chassis 103 and/or door 105. Hence, feed point 501 is in turn coupled to components of antenna feed 430 that transmit and receive signals using slot antenna 109, and ground 503 provides a grounding connection for antenna feed 430.

As each of feed point 501 and a ground 503 are located on internal surface 307 of chassis 103 and/or door 105 opposite slot antenna 109 located at external surface 107, in the implementations, antenna feed 430 capacitively couples radio transceiver 424 to slot antenna 109 through internal surface 307 of door 105. Put another way, antenna feed 430 electrically connects radio transceiver 424 to slot antenna 109 through internal surface 307 of door 105.

Furthermore, as depicted, container 101 further comprises at least one bracket 505 attaching feed point 501 and ground 503 of antenna feed 430 to internal surface 307 of door 105. While two brackets 505 are depicted, which respectively attach a respective portion of connections 330 to internal surface 307, in other implementations one bracket 505 can be used which attaches various portions of connections 330 to internal surface 307. Furthermore, while each bracket 505 is depicted as a strap, at least one bracket 505 can include one or more bracket, mechanical devices straps, adhesives, fasteners and the like.

Figure 6:
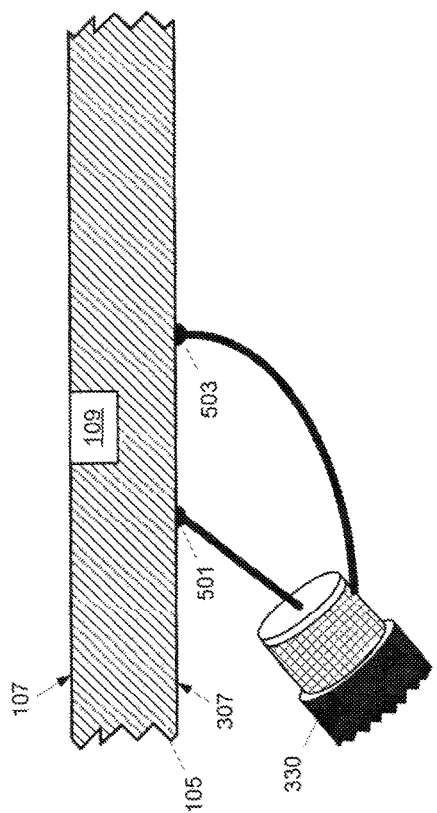
FIG. 6 depicts further detail of connections between the tracking device and the slot antenna, and includes a cross-section of the door through line A-A of FIG. 2, according to non-limiting implementations.

Attention is next directed to FIG. 6, which depicts a portion of door 105 through cross-section A-A of FIG. 2, as well as details of a specific non-limiting implementation of connections 330, feed point 501 and ground 503.

In particular, as depicted, connections 330 include a coaxial cable, and FIG. 6 depicts an end of the coaxial cable adjacent slot antenna 109. Hence, it is assumed that antenna feed 430 includes a coaxial connector which connects the coaxial cable thereto. Furthermore, feed point 501 can comprise a connection to an inner conductor (and/or center core) of the coaxial cable while ground 503 can comprise a connection to the conducting shield (and/or metallic shield) of the coaxial cable, each of the inner conductor and the conducting shield of the coaxial cable connected to corresponding components of antenna feed 430 within tracking device 111.

Furthermore, it is understood that inner conductor and the conducting shield of the coaxial cable are each electrically shielded from door 105 and hence, connections from each of feed point 501 and ground 503 to inner conductor and the conducting shield can comprise a dielectric material and/or an insulating material at least to each of feed point 501 and ground 503. In other words, connections to inner conductor and the conducting shield of the coaxial cable are depicted schematically and depicted components are appreciated to be suitably electrically insulated to prevent shorts between inner conductor and the conducting shield of the coaxial cable and door 105, other than at feed point 501 and ground 503.

In yet further implementations, feed point 501 and ground 503 can include a coaxial connector to which the coaxial cable of connections 330 can be attached; in such implementations, the coaxial connector can be electrically coupled to locations corresponding to feed point 501 and ground 503 as depicted in FIG. 5.

Furthermore, while not depicted, tracking device 111 and/or antenna feed 430 can include a coaxial connector to which the coaxial cable of FIG. 5 can be connected.

FIG. 6 further depicts a cross-section of a trough and/or slot of slot antenna 109, showing that, in these implementations, slot antenna 109 does not extend all the way through door 105.

Furthermore, each of feed point 501 and ground 503 are located on opposite sides of a trough and/or slot of slot antenna 109, but on internal side 307. Each of feed point 501 and ground 503 can be connected to internal side 307 using one or more of solder, conducting adhesive and the like; in other implementations, internal side 307 of door 105 can be adapted to include mechanical and/or electrical connectors (e.g. electro-mechanical devices) to connect each of feed point 501 and ground 503 thereto, which can include, but is not limited to, metal and/or conducting screws, metal and/or conducting brackets, wire connectors, wire terminals and the like. Indeed, such electro-mechanical devices can include locking mechanisms to firmly connect each of the inner conductor and the conducting shield of the coaxial cable to internal surface 307. Such electro-mechanical devices can be attached to internal side 307 using any suitable fasteners, which can include threaded holes in internal side 307 configured to receive threaded fasteners, such as bolts, screws and the like.

Figure 7:
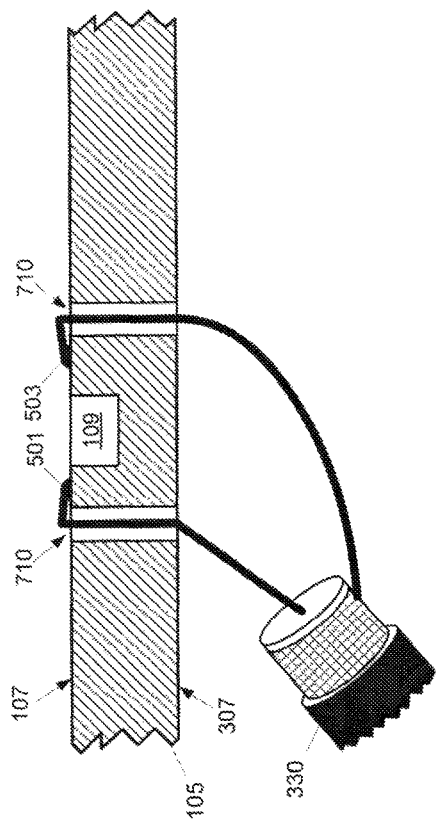
FIG. 7 depicts detail of alternative connections between the tracking device and the slot antenna, and includes a cross-section of the door through line A-A of FIG. 2, according to alternative non-limiting implementations.

Attention is next directed to FIG. 7 which depicts an alternative non-limiting implementation of door 105 and connections 330. FIG. 7 being substantially similar to FIG. 6 with like elements having like numbers. However, in these implementations, container 101 further comprises one or more apertures 710 through door 105 and/or chassis 103, antenna feed 430 comprising feed point 501 and ground 503 that couples antenna feed 430 to slot antenna 109 through one or more apertures 710. As depicted, door 105 has been adapted to include two apertures 710, one aperture 710 for each of feed point 501 and ground 503, and inner conductor and the conducting shield of the coaxial cable extend through respective apertures 710, respectively to feed point 501 and ground 503 which are located at external surface 107, adjacent slot antenna 109, again on opposite sides.

Furthermore, it is understood that inner conductor and the conducting shield of the coaxial cable are each electrically shielded from door 105 and hence, for example, each of apertures 710 can be filled with a non-conducting epoxy and/or adhesive connections from each of feed point 501 and ground 503 to inner conductor and the conducting shield. Alternatively and/or in addition to, connections from each of feed point 501 and ground 503 to inner conductor and the conducting shield can comprise a dielectric material and/or an insulating material at least to each of feed point 501 and ground 503. In other words, connections to inner conductor and the conducting shield of the coaxial cable are depicted schematically and depicted components are appreciated to be suitably electrically insulated to prevent shorts between inner conductor and the conducting shield of the coaxial cable and door 105, other than at feed point 501 and ground 503.

In yet further implementations, each of feed point 501 and ground 503 can be located in a respective aperture 710. In other implementations, one or more of apertures 710 can be replaced with a receptacle in internal surface 307 that is not all the way through door 105 (and/or chassis 103); in some of these implementations, such receptacles can include a connector to which feed point 501 or ground 503 can be connected and/or coupled and/or attached.

Figure 8:
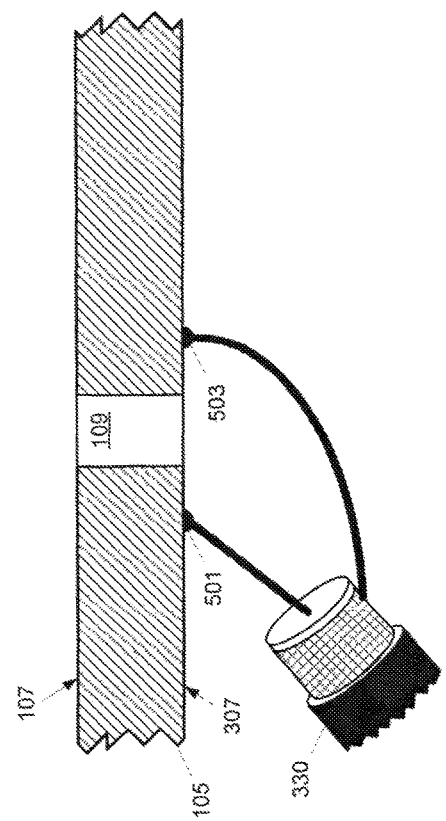
FIG. 8 depicts detail of connections between the tracking device and an alternative implementation of the slot antenna, and includes a cross-section of the door through line A-A of FIG. 2, according to alternative non-limiting implementations.

Attention is next directed to FIG. 8 which depicts an alternative non-limiting implementation of slot antenna 109, FIG. 8 being substantially similar to FIG. 6 with like elements having like numbers. However, in FIG. 8 slot antenna 109 extends through door 105 and hence can be filled with a non-conducting epoxy and/or adhesive to prevent moisture, water, air, and the like, from entering chassis 103 through slot antenna 109.

Figure 9:
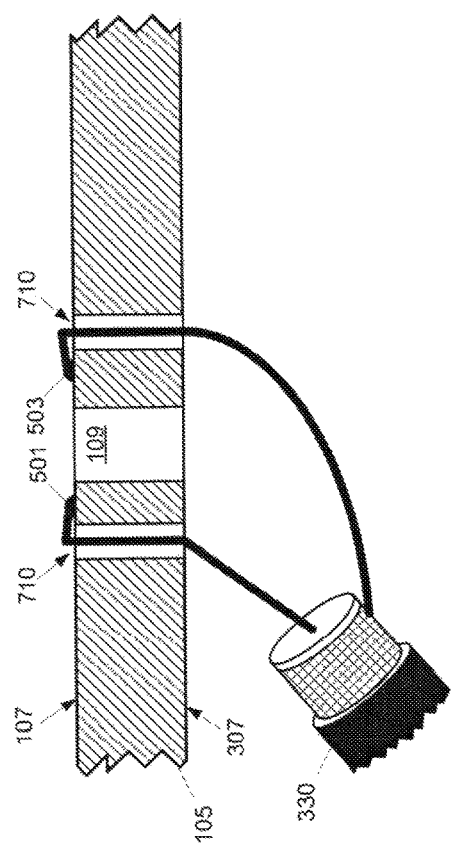
FIG. 9 depicts detail of alternative connections between the tracking device and the alternative slot antenna, and includes a cross-section of the door through line A-A of FIG. 2, according to alternative non-limiting implementations.

Attention is next directed to FIG. 9 which depicts an alternative non-limiting implementation of slot antenna 109, FIG. 9 being substantially similar to FIG. 7 with like elements having like numbers. However, in FIG. 9 slot antenna 109 extends through door 105 and hence can be filled with a non-conducting epoxy and/or adhesive to prevent moisture, water, air, and the like, from entering chassis 103 through slot antenna 109.

Figure 10:
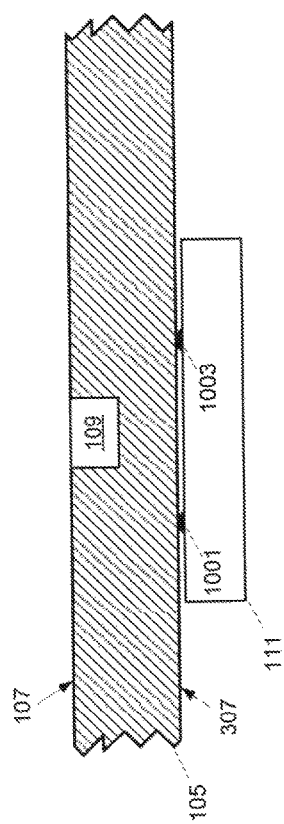
FIG. 10 depicts detail of alternative connections between the tracking device and the slot antenna, and includes a cross-section of the door through line A-A of FIG. 2, the tracking device including spring-loaded connectors, according to alternative non-limiting implementations.

Attention is next directed to FIG. 10 which depicts an alternative non-limiting implementation of tracking device 111, and connections between tracking device 111 and slot antenna 109, FIG. 10 being substantially similar to FIG. 6 with like elements having like numbers. However, in FIG. 10, tracking device 111 has been adapted to include, one or more of electro-mechanical connectors, and in particular spring-loaded connectors and the like to components of antenna feed 430. In particular, FIG. 10 depicts a side view tracking device 111 which has been adapted to include a first spring-loaded connector 1001 and a second spring-loaded connector 1003 which extend, for example, from a side of tracking device 111, including, but not limited to a rear side, and are spaced apart by a distance that is similar to a width of a slot of slot antenna 109. First spring-loaded connector 1001 comprises a feed point of antenna feed 430 while second spring-loaded connector 1003 comprises a ground of antenna feed 430 hence first spring-loaded connector 1003 and second spring-loaded connector 1003 are respectively similar to feed point 501 and ground 503. However, as first spring-loaded connector 1001 and a second spring-loaded connector 1003 extend from side of tracking device 111, antenna feed 430 can be coupled to slot antenna 109 through internal surface 307 of door 105 by attaching tracking device 111 to internal surface 307 of door 105 such that first spring-loaded connector 1001 and a second spring-loaded connector 1003 are located on opposite sides of a slot of slot antenna 109 (e.g. using a bracket and the like, not depicted, but which can be similar to bracket 309).

In other words, in these implementations, a feed point and a ground of antenna feed 430 comprises a pair of spring-loaded electrical connectors 1001, 1003 extending from a surface of tracking device 111, and the coupling of radio transceiver 424 to slot antenna 109 through internal surface 307 of door 105 occurs using spring-loaded electrical connectors 1001, 1003.

Figure 11:
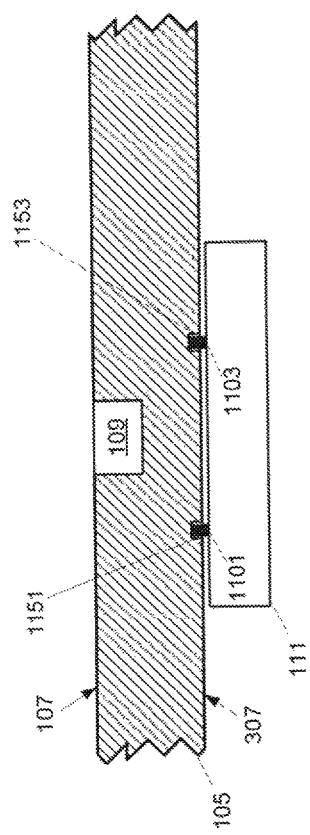
FIG. 11 depicts detail of alternative connections between the tracking device and the slot antenna, and includes a cross-section of the door through line A-A of FIG. 2, the tracking device including connectors extending therefrom, and an internal surface of the door including respective receptacles, according to alternative non-limiting implementations.

Attention is next directed to FIG. 11 which depicts an alternative non-limiting implementation of tracking device 111, and connections between tracking device 111 and slot antenna 109, FIG. 11 being substantially similar to FIG. 10 with like elements having like numbers. However, in FIG. 11, tracking device 111 has been adapted to include electrical connectors 1101, 1103 which extend from a side of tracking device 111 which can mate with respective receptacles 1151, 1153 located at internal surface 307 of door 105.

In particular, FIG. 11 depicts a side view tracking device 111 which has been adapted to include a first connector 1101 and a second connector 1103 which extend, for example, from a side of tracking device 111, including, but not limited to a rear side, and are spaced apart by a distance that is similar to a width of a slot of slot antenna 109. As depicted, each of connectors 1101, 1103 comprise a respective post, and the like, extending from tracking device 111.

Furthermore, internal surface 307 of door 105 has been adapted to include receptacles 1151, 1153, each spaced apart by a similar distance as connectors 1101, 1103, and each shaped similarly to connectors 1101, 1103. In particular, receptacle 1151 is shaped and located to receive first connector 1101, and receptacle 1153 is shaped and located to receive second connector 1103. Hence, tracking device 111 can be attached to internal surface 307 by inserting each of connectors 1101, 1103 into respective receptacles 1151, 1153. In particular, when each of connectors 1101, 1103 is received in a respective receptacle 1151, 1153, each of connectors 1101, 1103 makes electrical contact (and/or electrically couples with) a respective receptacle 1151, 1153. In some implementations, conducting epoxy and the like can be used between each of connectors 1101, 1103 and a respective receptacle 1151, 1153 to promote such electrical contact and to assist in holding tracking device 111 in place at internal surface 307.

Alternatively, one or more of connectors 1101, 1103 and receptacles 1151, 1153 can be adapted to include mechanical devices that assist in such electrical contact and to further assist in holding tracking device 111 in place at internal surface 307; such mechanical devices can include, but are not limited to, latches, spring-loaded devices, and the like.

First connector 1101 comprises a feed point of antenna feed 430 while second connector 1103 comprises a ground of antenna feed 430, hence first connector 1101 and second connector 1103 are respectively similar to feed point 501 and ground 503. However, as first connector 1101 and a second connector 1103 extend from side of tracking device 111, antenna feed 430 can be coupled to slot antenna 109 through internal surface 307 of door 105 by attaching tracking device 111 to internal surface 307 of door 105 such that first connector 1101 and a second connector 1103 are received in a respective receptacle 1151, 1153.

Furthermore, while not depicted, attachment of tracking device 111 to internal surface 307 can be further assisted by a bracket and the like, not depicted, but which can be similar to bracket 309.

Figure 12:
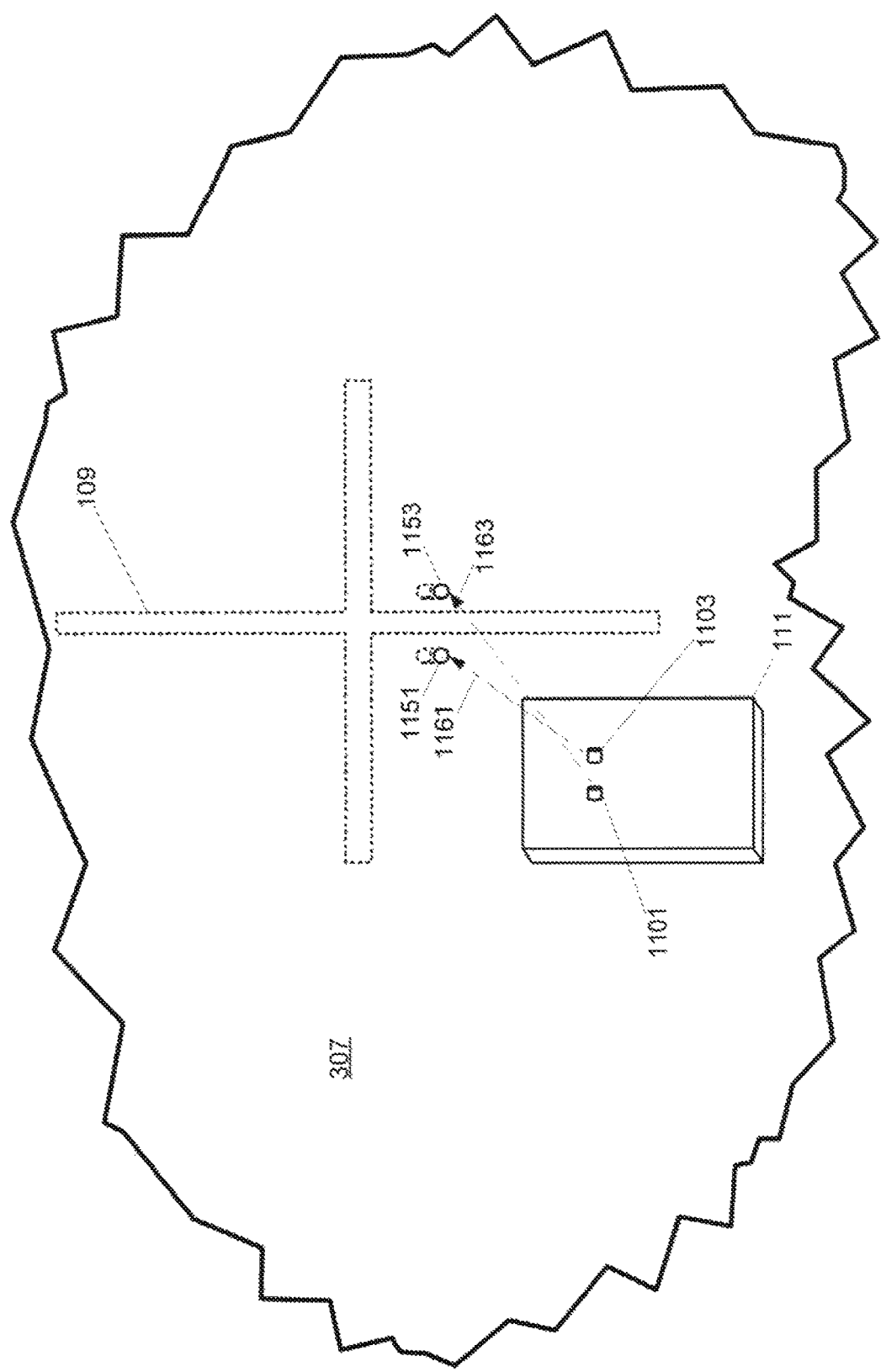
FIG. 12 depicts the tracking device and internal surface of the door depicted in FIG. 11 prior to mating, according to alternative non-limiting implementations.
Figure 13:
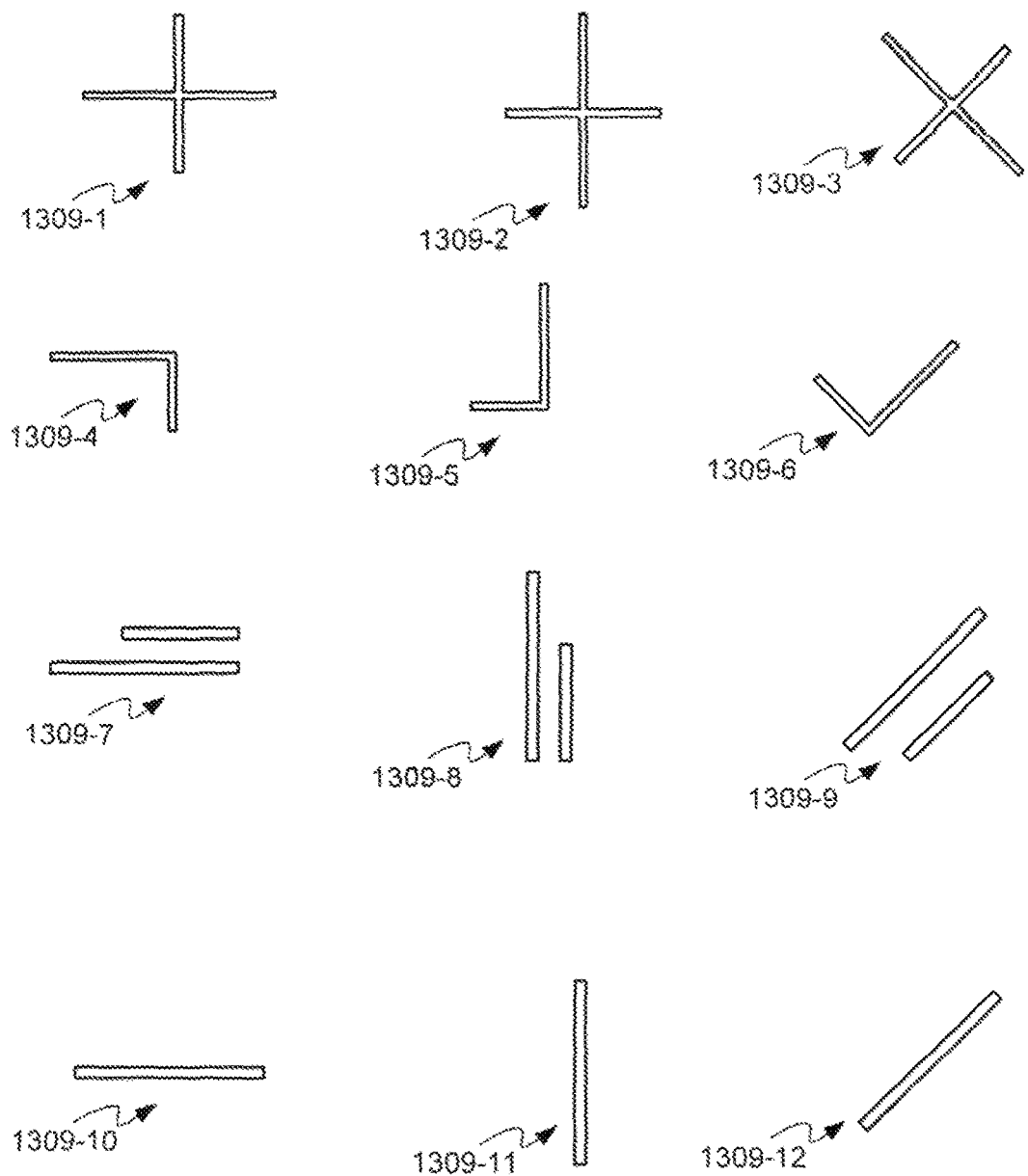
FIG. 13 depicts various example implementations of slot antennas, according to non-limiting implementations.

Attention is next directed to FIG. 12 which depicts the tracking device 111 and internal surface 307 of FIG. 11 in perspective, prior to mating, with like elements having like numbers. In FIG. 12, a side of tracking device 111 from which connectors 1101, 1103 extend is depicted, as well as a location of receptacles 1151, 1153 relative to a location of slot antenna 109 at external surface 107 (slot antenna 109 being depicted in broken lines to indicate that slot antenna 109 is located on a side opposite internal surface 307). An external portion of receptacles 1151, 1153 are depicted with solid lines, while internal portions of receptacles 1151, 1153 are depicted in broken lines. Furthermore, arrows 1161, 1163 indicate that tracking device 111 can be manoeuvered such that connector 1101 is inserted into receptacle 1151 and connector 1103 is inserted into receptacle 1153.

In other words, in these implementations, a feed point and a ground of antenna feed 430 comprises a pair of electrical connectors 1101, 1103 extending from a surface of tracking device 111, and internal surface 307 of door 105 comprises a pair of receptacles 1151, 1153 configured to mate with electrical connectors 1101, 1103. Hence the coupling of radio transceiver 424 to slot antenna 109 through internal surface 307 of door 105 occurs using pair of electrical connectors 1101, 1103 and pair of receptacles 1151, 1153.

Implementations depicted in FIGS. 10, 11 and 12 can obviate use of cables, and the like, to couple antenna feed 430 to internal surface 307 of door 105, and can be further used to more precisely locate a feed point and ground of antenna feed 430 relative to slot antenna 109.

Attention is next directed to FIG. 12 which depicts various non-limiting implementations of slot antennas 1309-1, 1309-2, 1309-3, 1309-4, 1309-5, 1309-6, 1309-7, 1309-8, 1309-9, 1309-10, 1309-11, 1309-12, that could be used with container 101. Each of slot antennas 1309-1, 1309-2, 1309-3 comprise two slot antennas of different lengths arranged in a cross-shape and oriented in different directions, with slot antennas 1309-1, 1309-2 being similar but rotated 90° with respect to one another, and slot antenna 1309-3 being rotated 45° with respect to either of slot antennas 1309-1, 1309-2.

Each of slot antennas 1309-4, 1309-5, 1309-6 are respectively similar to slot antennas 1309-1, 1309-2, 1309-3, however each of the two respective slot antennas are arranged in an "L" shape.

As each of slot antennas 1309-1, 1309-2, 1309-3, 1309-4, 1309-5, 1309-6 include two slot antennas of unequal length, in these implementations antenna feed 430 can be adapted to include one or more antenna feeds each configured to convey a respective set of frequencies between the radio transceiver and a slot antenna 1309-1, 1309-2, 1309-3, 1309-4, 1309-5, 1309-6. Such an antenna feed can also be referred to as a multifeed antenna feed. In some of these implementations, antenna feed 430 can include one feed point and one ground and antenna feed 430 can be configured to operate at different sets of frequencies using the one feed point and one ground. Alternatively, antenna feed 430 can include a plurality of feed points and one or more grounds, as well as connections to each of the plurality of feed points and one or more grounds, and antenna feed 430 can be configured to operate at different sets of frequencies using the plurality of feed points and one or more grounds.

Each of slot antennas 1309-7, 1309-8, 1309-9 are respectively similar to slot antennas 1309-1, 1309-2, 1309-3; however, each of the two respective slot antennas are arranged about parallel to one another, hence slot antennas 1309-7, 1309-8, 1309-9 comprise two slots that are not otherwise connected. Furthermore a distance between each of the two respective slot antennas of slot antennas 1309-7, 1309-8, 1309-9 can vary and furthermore each of the two respective slot antennas of slot antennas 1309-7, 1309-8, 1309-9 need not be adjacent to one another, nor be at the same angle. Hence, in these implementations, tracking device 111 and/or antenna feed 430 can be adapted to include a plurality of connections to slot antennas 1309-7, 1309-8, 1309-9, for example a feed point and a ground for each of the two respective slot antennas of slot antennas 1309-7, 1309-8, 1309-9.

As each of slot antennas 1309-1, 1309-2, 1309-3, 1309-4, 1309-5, 1309-6, 1309-7, 1309-8, 1309-9 comprises two respective slot antennas, in these implementations, antenna feed 430 comprises one or more antenna feeds each configured to convey a respective set of frequencies between radio transceiver 424 and slot antenna 109, as described above.

Similarly, as each of slot antennas 1309-1, 1309-2, 1309-3, 1309-4, 1309-5, 1309-6 comprise two connected slot antennas in these implementations, antenna feed 430 can be configured to convey a plurality of sets of frequencies between radio transceiver 424 and slot antenna 109, as described above.

Finally, each of slot antennas 1309-10, 1309-11, 1309-12 comprise a single slot antenna and hence, in these implementations, antenna feed 430 can be adapted to convey a single set of frequencies between the radio transceiver and a slot antenna 1309-10, 1309-11, 1309-12. For example, in these implementations, tracking device 111 can be configured to communicate only with a communication network, and not a location determining network, and further configured to determine a location of container 101 using triangulation techniques and the like.

It should now be apparent that wide variety of slot antennas are within the scope of present implementations and that further implementations thereof are within the scope of present implementations including, but not limited to, combinations of any of slot antennas 1309-1, 1309-2, 1309-3, 1309-4, 1309-5, 1309-6, 1309-7, 1309-8, 1309-9, 1309-10, 1309-11, 1309-12.

Persons skilled in the art will appreciate that there are yet more alternative implementations and modifications possible. For example, while present implementations are described with respect to slot antenna 109 being in a door of a shipping container, in other implementations, container 101 can comprise another type of container, and furthermore, slot antenna 109 can be located elsewhere on the container and/or the shipping container, including, but not limited to, a non-moveable portion of a container, a top surface, a bottom surface, a side surface, an end surface, a moveable portion of a container, a removable access panel, and the like. Hence, generically, present implementations can include a container comprising: a chassis; at least one slot antenna located at an external surface of the chassis; a tracking device having a radio transceiver, the tracking device located inside the chassis; and, an antenna feed coupling the radio transceiver to the slot antenna through an internal surface of the chassis.

It is furthermore appreciated that existing containers and/or shipping containers can be adapted to include systems and devices disclosed herein. For example, one or more slot antennas as disclosed herein can be milled into an existing container and/or shipping container, as well as any receptacles as described above with respect to FIGS. 11 and 12.

Hence, provided herein are containers that include a slot antenna at an external surface of a container, with a tracking device located inside the container, an antenna feed of the tracking device coupled to the slot antenna through the container and in particular through an internal surface of the container. In some implementations, such coupling can include apertures through the container through which connectors to the slot antenna, from the tracking device, are located. In other implementations such coupling can be capacitive and no components of the tracking device are located external to the container, other than the slot antenna, which can be milled and/or drilled into the external surface; such implementations can generally be robust and ruggedized and the likelihood of damaging the tracking device and/or the slot antenna and/or connections there between can be minimized.

Those skilled in the art will appreciate that in some implementations, the functionality of tracking device 111 can be implemented using pre-programmed hardware or firmware elements (e.g., application specific integrated circuits (ASICs), electrically erasable programmable read-only memories (EEPROMs), etc.), or other related components. In other implementations, the functionality of tracking device 111 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive, flash memory, and the like). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem, network interface card, or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended here.

What is claimed is:

1. A shipping container comprising:
   a chassis; a door moveably mounted to the chassis, the door having an external surface and an internal surface;
   at least one slot antenna located at the external surface of the door;
   a tracking device having a radio transceiver, configured to determine a location of the container and wirelessly provide the location to a remote device, the tracking device at least partially located on the internal surface of the door; and,
   an antenna feed coupling the radio transceiver to the slot antenna through the internal surface of the door,
   wherein a feed point and a ground of the antenna feed comprises a pair of spring-loaded electrical connectors extending from a surface of the tracking device, and the coupling of the radio transceiver to the slot antenna through the internal surface of the door occurs using the spring-loaded electrical connectors.

2. The shipping container of claim 1, wherein the feed point and the ground of the antenna feed are each located at the internal surface of the door opposite the slot antenna on the external surface.

3. The shipping container of claim 1, further comprising at least one bracket attaching the feed point and the ground of the antenna feed to the internal surface of the door.

4. The shipping container of claim 1, further comprising one or more apertures through the door, the ground of the antenna feed coupling the antenna feed to the slot antenna through the one or more apertures.

5. The shipping container of claim 1, wherein the tracking device is attached to the internal surface of the door using one or more of a bracket and a protective cage.

6. The shipping container of claim 1, wherein the slot antenna comprises one or more of a cellular antenna, a GPS (Global Positioning System) antenna, and a GLONASS (Navigazionnaya Sputnikovaya Sistema) antenna.

7. The shipping container of claim 1, wherein the slot antenna comprises one or more slots in the external surface of the door.

8. The shipping container of claim 1, wherein the slot antenna comprises a plurality of slots, each configured to transmit and receive a respective set of frequencies.

9. The shipping container of claim 1, wherein the antenna feed comprises one or more antenna feeds each configured to convey a respective set of frequencies between the radio transceiver and the slot antenna.

10. The shipping container of claim 1, wherein the antenna feed is configured to convey a plurality of sets of frequencies between the radio transceiver and the slot antenna.

11. A shipping container comprising:
a chassis; a door moveably mounted to the chassis, the door having an external surface and an internal surface;
at least one slot antenna located at the external surface of the door;
a tracking device having a radio transceiver, configured to determine a location of the container and wirelessly provide the location to a remote device, the tracking device at least partially located on the internal surface of the door; and,
an antenna feed coupling the radio transceiver to the slot antenna through the internal surface of the door,
wherein a feed point and a ground of the antenna feed comprises a pair of electrical connectors extending from a surface of the tracking device, and the internal surface of the door comprises a pair of receptacles configured to mate with the electrical connectors.

12. The shipping container of claim 11, wherein the feed point and the ground of the antenna feed are each located at the internal surface of the door opposite the slot antenna on the external surface.

13. The shipping container of claim 11, further comprising at least one bracket attaching the feed point and the ground of the antenna feed to the internal surface of the door.

14. The shipping container of claim 11, further comprising one or more apertures through the door, the ground of the antenna feed coupling the antenna feed to the slot antenna through the one or more apertures.

15. The shipping container of claim 11, wherein the tracking device is attached to the internal surface of the door using one or more of a bracket and a protective cage.

16. The shipping container of claim 11, wherein the slot antenna comprises one or more of a cellular antenna, a GPS (Global Positioning System) antenna, and a GLONASS (Navigazionnaya Sputnikovaya Sistema) antenna.

17. The shipping container of claim 11, wherein the slot antenna comprises one or more slots in the external surface of the door.

18. The shipping container of claim 11, wherein the slot antenna comprises a plurality of slots, each configured to transmit and receive a respective set of frequencies.

19. The shipping container of claim 11, wherein the antenna feed comprises one or more antenna feeds each configured to convey a respective set of frequencies between the radio transceiver and the slot antenna.

20. The shipping container of claim 11, wherein the antenna feed is configured to convey a plurality of sets of frequencies between the radio transceiver and the slot antenna.

* * * * *